United States Patent [19]
Piatt et al.

[11] Patent Number: 5,126,150
[45] Date of Patent: Jun. 30, 1992

[54] COMPOSITIONS CONTAINING PSYLLIUM

[75] Inventors: David M. Piatt; Julia M. Courts, both of Cincinnati; Mary M. Fox, Fairfield, all of Ohio

[73] Assignee: The Procter & Gamble Company, Cincinnati, Ohio

[21] Appl. No.: 590,982

[22] Filed: Oct. 1, 1990

[51] Int. Cl.$^5$ .................. A21D 13/00; A21D 8/00; A21D 13/08; A23L 1/29
[52] U.S. Cl. ..................... 426/94; 424/439; 426/96; 426/549; 426/574; 426/804; 514/23; 514/892
[58] Field of Search ............... 426/574, 804, 549, 94, 426/96; 424/439; 514/23, 892

[56] References Cited

U.S. PATENT DOCUMENTS

| | | | |
|---|---|---|---|
| Re. 32,811 | 12/1988 | Rudin | 424/195.1 |
| 2,060,336 | 4/1933 | Near et al. | 99/131 |
| 3,023,104 | 2/1962 | Battista | 99/1 |
| 3,148,114 | 9/1964 | Fahrenbach et al. | 167/55 |
| 3,219,455 | 11/1965 | Dubois | 99/90 |
| 3,455,714 | 7/1969 | Bishop et al. | 106/205 |
| 3,798,054 | 3/1974 | Kawata et al. | 117/100 |
| 3,954,976 | 5/1976 | Mattson et al. | 424/180 |
| 3,973,051 | 8/1976 | Buckley et al. | 426/574 |
| 3,982,003 | 9/1976 | Mitchell et al. | 426/574 |
| 3,992,147 | 11/1976 | Christian et al. | 21/58 |
| 4,005,195 | 1/1977 | Jandacek | 424/180 |
| 4,005,196 | 1/1977 | Jandacek et al. | 424/180 |
| 4,034,083 | 7/1977 | Mattson | 424/180 |
| 4,089,981 | 5/1978 | Richardson | 426/104 |
| 4,156,021 | 5/1979 | Richardson | 426/104 |
| 4,181,747 | 1/1980 | Kickle et al. | 426/615 |
| 4,315,954 | 2/1982 | Kuipers et al. | 426/583 |
| 4,321,263 | 3/1982 | Powell et al. | 424/195 |
| 4,341,805 | 7/1982 | Chaudhary | 426/481 |
| 4,348,379 | 9/1982 | Kowalsky et al. | 424/34 |
| 4,350,714 | 9/1982 | Duvall | 426/559 |
| 4,459,280 | 7/1984 | Colliopoulos et al. | 424/35 |
| 4,461,782 | 7/1984 | Robbins et al. | 426/549 |
| 4,497,841 | 2/1985 | Wudel et al. | 426/565 |
| 4,511,561 | 4/1985 | Madaus et al. | 424/195.1 |
| 4,548,806 | 10/1985 | Colliopoulos et al. | 424/35 |
| 4,551,331 | 11/1985 | Rudin | 424/195.1 |
| 4,565,702 | 1/1986 | Morley et al. | 426/804 |
| 4,568,557 | 2/1986 | Becker et al. | 426/618 |
| 4,619,831 | 10/1986 | Sharma | 426/804 |
| 4,639,367 | 1/1987 | Mackles | 424/45 |
| 4,668,519 | 5/1987 | Dartey et al. | 426/658 |
| 4,673,578 | 6/1987 | Becker et al. | 426/93 |
| 4,678,672 | 7/1987 | Dartey et al. | 426/19 |
| 4,698,232 | 10/1987 | Sheu et al. | 426/572 |
| 4,737,364 | 4/1988 | Kalogris | 424/195.1 |
| 4,747,881 | 5/1988 | Shaw et al. | 106/209 |
| 4,766,004 | 8/1988 | Moskowitz | 426/658 |
| 4,778,676 | 10/1988 | Yang et al. | 424/79 |
| 4,784,861 | 11/1988 | Gori | 426/804 |
| 4,814,172 | 3/1989 | Chavkin et al. | 424/195.1 |
| 4,824,672 | 4/1989 | Day | 424/195.1 |
| 4,834,990 | 5/1989 | Amer | 426/74 |
| 4,849,222 | 7/1989 | Broaddus | 424/195.1 |
| 4,950,140 | 8/1990 | Pflaumer | 426/804 |
| 4,950,689 | 8/1990 | Yang et al. | 514/777 |
| 5,009,916 | 4/1991 | Colliopoulis | 426/615 |

FOREIGN PATENT DOCUMENTS

| | | |
|---|---|---|
| 105195 | 4/1984 | European Pat. Off. |
| 144644 | 6/1985 | European Pat. Off. |
| 285201 | 10/1988 | European Pat. Off. |
| 306469 | 3/1989 | European Pat. Off. |
| 323666 | 7/1989 | European Pat. Off. |
| 387933 | 9/1990 | European Pat. Off. |
| 2430509 | 1/1976 | Fed. Rep. of Germany |
| 2165795 | 12/1971 | France |
| 60-019458 | 1/1985 | Japan |
| 61-282046 | 12/1986 | Japan |
| 63-264534 | 11/1988 | Japan |
| 1590507 | 6/1981 | United Kingdom |
| 2067402 | 7/1981 | United Kingdom |
| 2201875 | 9/1988 | United Kingdom |
| 80/00658 | 4/1980 | World Int. Prop. O. |

OTHER PUBLICATIONS

Goodman and Gilman, The Pharmacologic Basis of Therapeutics, 6th Edition, 1004 and 1007 (1980).
Garvin et al., Proc. Soc. Exp. Biol. Med., 120, 744–746 (1965).
Forman et al, Proc. Soc. Exp. Biol. Med., 127, 1060–1063 (1968).
Anderson et al, Fed. Proc., 46, 877 (1987).
Anderson et al., Am. J. Gastroenterology, 81, 907–919 (1986).
Fagerberg, Curr. Ther. Res., 31, 166 (1982).
Patent Abstracts of Japan, vol. 11, No. 141, May 8, 1987.
Fiberall® Fiber Wafers, distributed by CIBA Consumer Pharmaceuticals, Edison, N.J.
Physicians' Desk Reference for Nonprescription Drugs, 8th Edition, 1987, "Fiberall® Fiber Wafers", at p. 681.

Primary Examiner—Jeanette Hunter
Assistant Examiner—Mary S. Mims
Attorney, Agent, or Firm—Kim William Zerby; Douglas C. Mohl; Richard C. Witte

[57] ABSTRACT

Calcium lactate coated psyllium fiber composition and psyllium-containing baked cookie composition having high fiber content and good eating qualities. These baked cookies comprise calcium lactate coated psyllium fiber, insoluble dietary fiber, shortening, flour, sugar and water. Eating quality of these psyllium-containing cookies is especially enhanced by their reduced tendency for the composition to stick to and/or form a film on teeth during ingestion.

20 Claims, No Drawings

1

COMPOSITIONS CONTAINING PSYLLIUM

BACKGROUND OF THE INVENTION

The present invention relates to calcium lactate coated psyllium compositions, especially high fiber baked cookies comprising calcium lactate coated psyllium, and to methods for preparing these compositions. These cookies essentially comprise calcium lactate coated psyllium and (preferably) insoluble dietary fiber, flour, shortening and water. These baked cookies have excellent texture, mouthfeel and palatability. They are useful as dietary aids in the control of bowel function (including use as laxatives) and/or for reducing blood cholesterol levels and/or for weight control or other indications where fiber may be beneficial.

U.S. Pat. No. 4,784,861, to Gori, issued Nov. 15, 1988, describes powders formed of a mixture of oat, wheat and corn bran mixed with pectin, guar gum, psyllium and cutin to which mineral supplements have been added. U.S. Pat. No. 4,619,831, to Sharma, issued Oct. 28, 1986, describes dietary fiber products comprising insoluble dietary fiber (92-98.5%) coated or enrobed with soluble dietary fiber (1.5-8%; psyllium is mentioned as one of many soluble fibers). U.S. Pat. No. 4,565,702, to Morley et al., issued Jan. 21, 1986, describes dietary fiber compositions comprising dietary fibers which are insoluble fibers coated with soluble fiber. U.S. Pat. No. 4,348,379, to Kowalsky et al., issued Sep. 7, 1982, describes dietetic compositions comprising psyllium seed, linseed, and wheat bran. European Patent Application Publication No. 144,644, published Jun. 19, 1985 by G. D. Searle and Co., describes high fiber food compositions comprising psyllium and other dietary fiber sources.

West German Patent Specification 2,430,509, published Jan. 15, 1976 by Hypolab S. A., Genf. (Schweiz), describes preparing compositions containing bulk laxatives (including psyllium mucilloid) in the form of a cake. The cake dough is prepared and baked in molds to produce cakes having thickness of 3-6 mm.

Reduced calorie baked cookies containing microcrystalline cellulose as a preferred bulking agent are disclosed in U.S. Pat. No. 4,668,519, to Dartey et al., issued May 26, 1987. This patent indicates that these cookies can optionally include bulking agents such as dietary fibers (including psyllium fiber) at levels up to about 10% by weight of the dough.

Great Britain Patent Specification 1,590,507, published Jun. 3, 1981, by Syntex (U.S.A.) Inc., describes compositions comprising mixtures of purified cellulose and pectin as a source of dietary fiber. The effectiveness of these compositions for controlling fecal output in humans is compared versus various other compositions, including biscuits which comprise only psyllium.

Several other U.S. patents describe non-baked compositions in which psyllium is described as an optional or essential ingredient: 4,778,676, to Yang et.al., issued Oct. 18, 1988 (describes chewable compositions comprising a precoated active and a confectionery matrix); 4,766,004, to Moskowitz, issued Aug. 23, 1988 (describes dietary fiber supplement compositions comprising whole psyllium husks having a particle size of from 12 to 70 mesh, food grade vegetable fat which is a solid at room temperature, sweetening agent and flavoring agent); 4,737,364, to Kalogris, issued Apr. 12, 1988 (describes low calorie dry food concentrate); 4,698,232, to Sheu et al., issued Oct. 6, 1987 (describes fiber-containing confectionery compositions comprising dietary fiber pretreated with a lubricant, a foamed matrix, and an amorphous matrix); and 4,551,331, to Rudin, issued Nov. 5, 1985 and R.E. 32,811, issued Dec. 27, 1988 (describe dietary fiber products comprising a dietary fiber coated with a food grade emulsifier).

In addition to the preceding publications, the following publications are also worth mentioning herein: U.S. Pat. No. 3,219,455, to Dubois, issued Nov. 23, 1965; U.S. Pat. No. 4,461,782, to Robbins et al., issued Jul. 24, 1984; U.S. Pat. No. 3,954,976, to Mattson et al., issued May 4, 1976; U.S. Pat. No. 4,005,195, to Jandacek, issued Jan. 25, 1977; U.S. Pat. No. 4,005,196, to Jandacek et al., issued Jan. 25, 1977; U.S. Pat. No. 4,034,083, to Mattson, issued Jul. 5, 1977; U.S. Pat. No. 3,455,714, to Bishop et al., issued Jul. 15, 1969; U.S. Pat. No. 4,321,263, to Powell et al., issued Mar. 23, 1982; U.S. Pat. No. 4,673,578, to Becker et al., issued Jun. 16, 1987; U.S. Pat. No. 4,568,557, to Becker et al., issued Feb. 4, 1986; U.S. Pat. No. 2,060,336, to Near et al., issued Apr. 5, 1933; U.S. Pat. No. 4,156,021, to Richardson, issued May 22, 1979; U.S. Pat. No. 4,089,981, to Richardson, issued May 16, 1978; U.S. Pat. No. 3,023,104, to Battista, issued Feb. 27, 1962; U.S. Pat. No. 4,511,561, to Madaus et al., issued Apr. 16, 1985; U.S. Pat. No. 4,459,280, to Colliopoulos et al., issued Jul. 10, 1984; U.S. Pat. No. 4,341,805, to Chaudhary, issued Jul. 27, 1982; U.S. Pat. No. 4,181,747, to Kickle et al., issued Jan. 1, 1980; U.S. Pat. No. 4,350,714, to Duvall, issued Sep. 21, 1982; U.S. Pat. No. 4,315,954, to Kuipers, issued Feb. 16, 1982; U.S. Pat. No. 3,992,147, to Christian et al., issued Nov. 16, 1976; U.S. Pat. No. 3,148,114, to Fahrenbach et al., issued Sep. 8, 1964; U.S. Pat. No. 4,639,367, to Mackles, issued Jan. 27, 1987; French Patent Specification 2,165,795, published Dec. 31, 1971; European Patent Application Publication No. 105,195, published Apr. 11, 1984; European Patent Application Publication No. 285,201, published Oct. 5, 1988; Great Britain Patent Specification 2,067,402, published Jul. 30, 1981; Great Britain P Specification 2,201,875, published Sep. 14, 1988; World Patent Application Publication No. 80/00658, published Apr. 17, 1980; Goodman & Gilman, The Pharmacologic Basis of Therapeutics, Fifth Edition, 979 (1975); Garvin et al., *Proc. Soc. Exp. Biol. Med.*, 120, 744–746 (1965); Forman et al., *Proc. Soc. Exp. Biol. Med.*, 127, 1060–1063 (1968); Anderson et al., *Fed. Proc.* 46, 877 (1987); Anderson et al., *Am. J. Gastroenterol.*, 907–919 (1986); and Faberberg, *Curr. Ther. Res.* 31, 166 (1982).

In spite of the large amount of research aimed at developing portable and palatable compositions containing psyllium, there is a continuing need to provide additional compositions having psyllium at levels high enough to provide therapeutic benefits in reasonably sized, portable compositions having good eating aesthetics. It has been discovered that such compositions can be prepared in the form of a cookie by using calcium lactate coated psyllium, preferably along with insoluble fiber. The psyllium fiber coating comprises the polyvalent cation-containing material calcium lactate, and also preferably a Type A gelatin is employed to further coat the calcium lactate coated psyllium fibers. By using the calcium lactate coated psyllium fiber in these compositions, it has been surprisingly discovered that the eating quality of the cookie compositions are greatly enhanced, especially with regard to the stickiness of the composition (i.e., the tendency of the composition to stick to and/or form an unpleasant coating on the teeth during ingestion). Such compositions, and the methods for making them, are also well suited for large scale manufacture of portable, palatable and efficacious psyllium-containing cookies.

It is an object of the present invention to provide compositions which are convenient, portable and highly palatable (e.g., having excellent texture and mouthfeel) psyllium-containing cookies. An object of the present invention is also to provide convenient, portable psyllium-containing compositions having good consumer acceptance to promote compliance with a regimen for providing laxation benefits and/or reducing serum cholesterol levels and/or weight control. A further object is to provide psyllium-containing compositions having little or no gummy or rubbery texture and reduced stickiness during ingestion. Also, an object is to provide portable psyllium-containing compositions which are efficacious for providing laxation benefits and/or reducing serum cholesterol levels. Further, an object is to provide highly palatable compositions which provide both psyllium fiber and calcium. An object of the present invention is also to provide methods for preparing these efficacious baked cookie compositions.

These and other objects of the present invention will become readily apparent from the detailed description which follows.

All percentages and ratios used herein are by weight unless otherwise specified, and all measurements are made at 25° C. unless otherwise specified.

SUMMARY OF THE INVENTION

The present invention relates to calcium lactate coated psyllium compositions. These compositions comprise from about 0.5% to about 10% of calcium lactate, and from about 85% to about 99.5% psyllium fiber, wherein the calcium lactate coats the psyllium fiber. Preferred is such compositions further comprising from about 1% to about 5% of Type A gelatin, wherein this gelatin also coats the calcium lactate coated psyllium fiber.

The present invention also relates to highly palatable psyllium-containing baked cookie compositions. These compositions comprise: from about 10% to about 20% calcium lactate coated psyllium fiber, from about 13% to about 20% of a shortening component, from about 10% to about 40% of a flour component, from about 5% to about 40% of a sugar component, from about 1.5% to about 3.5% water, and preferably from about 3% to about 17% of an insoluble dietary fiber.

The present invention also relates to methods for making the baked cookie compositions of the present invention. These methods comprise the steps of: (a) coating the psyllium fibers with calcium lactate and, optionally, Type A gelatin; (b) mixing to a uniform mass either sequentially or all at once the calcium lactate coated psyllium fiber (and preferably the insoluble fiber) with the remaining components of the cookie dough; and (c) baking the dough to reduce the water content of the cookie composition to within from about 1.5% to about 3.5% by weight of the baked cookie composition.

The present invention further relates to methods for reducing serum cholesterol levels, and for providing laxation and regulating bowel function. These methods comprise orally administering to a human in need of such treatment a safe and effective amount of a composition of the present invention.

DETAILED DESCRIPTION OF THE INVENTION

Calcium Lactate Coated Psyllium Compositions

The present invention relates to calcium lactate coated psyllium fiber compositions. These compositions comprise psyllium fiber coated with calcium lactate, and preferably also with Type A gelatin.

(a) Psyllium Fiber

The term "psyllium fiber", as used herein, means the seed coat of psyllium seed (either intact or macerated or otherwise comminuted). Psyllium fiber comes from psyllium seed, from plants of the *Plantago* genus. Various species such as *Plantago lanceolate*, *P. rugelii*, and *P. major*, are known. Commercial psyllium includes the French (black; *Plantago indica*), Spanish (*P. psyllium*) and Indian (blonde; *P. ovata*). Indian (blonde) psyllium is preferred for use herein.

Intact or macerated seeds can be used in the practice of this invention. However, it is typical to remove the seed coats from the rest of the seed by, for example, slight mechanical pressure, and then to use only the seed coat. In the practice of the present invention it is convenient and desirable to use macerated seed coat in the final composition. The seed coat is therefore preferably removed and sanitized by methods known in the art (e.g., ethylene oxide sanitization or steam sanitization as described in U.S. Pat. No. 4,911,889, issued Mar. 27, 1990 to Leland et al., incorporated herein by reference in its entirety) prior to use in the present composition. Furthermore, the psyllium fiber utilized preferably has high purity, being about 85% to about 100% pure, and more preferably being about 95% to about 100% pure.

The calcium lactate coated psyllium composition comprises from about 85% to about 99.5%, preferably from about 85% to about 98.5%, and more preferably from about 90% to about 97%, psyllium fiber by weight of the coated compositions.

(b) Calcium Lactate Coating

According to the present invention, calcium lactate is used to coat the psyllium fibers. The term "coat", as used herein, means attaching the coating material (calcium lactate and/or Type A gelatin, if it is used) to the psyllium fiber, preferably by forming a layer of coating material on or around the psyllium fibers. One source of calcium lactate is a granular calcium lactate pentahydrate sold by Gallard-Schlesinger Industries Inc., N.Y.

The coating of the psyllium fiber may be achieved by spraying or otherwise wetting the psyllium fiber with an aqueous solution of calcium lactate, preferably an aqueous solution of calcium lactate containing 10% calcium lactate. (Preferred methods for coating the psyllium fiber are described in more detail hereinafter.) The calcium lactate coated psyllium compositions typically comprise from about 0.5% to about 10%, preferably from about 3% to about 7%, of calcium lactate by weight of the coated composition.

(c) Type A Gelatin Coating

A preferred optional component useful in the psyllium fiber coating is Type A gelatin. The term "Type A gelatin", as used herein, means a gelatin formed by acid hydrolysis with an isoelectric point of about B. An example of a Type A gelatin which can be used herein is pigskin gelatin, Type A, 275 Bloom manufactured by Knox Gelatin Inc., Saddle Brook, N.J.

Preferably, the Type A gelatin is applied as a further coating to the calcium lactate coated psyllium fiber. This preferably may be achieved by spraying or otherwise wetting the calcium lactate coated psyllium fiber with an aqueous mixture of Type A gelatin, preferably 10% by weight of the aqueous composition. The calcium lactate coated composition may comprise from about 0% to about 5%, preferably from about 1.5% to about 2.5% of Type A gelatin by weight of the coated composition.

Baked Cookie Compositions Containing Psyllium

The present invention further relates to high fiber psyllium-containing baked cookie compositions comprising calcium lactate coated psyllium fiber. These baked cookie compositions comprise: (a) calcium lactate coated psyllium fiber; (b) insoluble dietary fiber; (c) shortening component; (d) flour component; (e) sugar component; and (f) water. The essential and optional components for use in compositions of the present invention, and the amounts to be utilized, are described in detail hereinafter.

(a) Calcium Lactate Coated Psyllium

The present cookie compositions comprise psyllium fiber coated with calcium lactate (and preferably also Type A gelatin) as described hereinbefore. The baked cookie compositions of the present invention essentially comprise from about 10% to about 20% calcium lactate coated psyllium fiber, preferably from about 11% to about 18% calcium lactate coated psyllium fiber, and more preferably from about 12% to about 15% calcium lactate coated psyllium fiber, by weight of the baked composition.

(b) Insoluble Dietary Fiber

The present cookies also preferably comprise insoluble dietary fiber. The term "insoluble dietary fiber", as used herein, means the water insoluble, substantially non-swellable component of fiber material safe for human ingestion which is non-digestible and non-metabolizable by humans.

A wide range of materials containing insoluble dietary fiber may be used in the present invention. Preferred are cereal brans and mixtures thereof, due to their relatively high content of insoluble dietary fiber. Also preferred is that these cereal brans comprise at least about 75% of the insoluble dietary fiber. Cereal brans useful in the present invention include those selected from the group consisting of wheat, corn, barley, rye, oats and mixtures thereof. Most preferred are oat or corn. The components of the insoluble dietary fiber from these cereal brans are known to be cellulose, hemicellulose and lignin.

When the insoluble dietary fiber content of a composition of the present invention is to be determined, an analytical technique which may be used is disclosed in the Association of Analytical Chemist publication "Total Dietary Fiber: AOAC Collaborative Study", Jan. 25, 1982, incorporated herein by reference in its entirety. This technique utilizes enzymatic and chemical procedures to isolate the dietary fiber. When wheat bran or corn bran for example is treated according to this AOAC method, the recoverable dietary fiber is an insoluble fiber. The bran is first treated with a solvent, e.g., petroleum ether or hexane, to remove the fat. The defatted bran is then digested enzymatically with protease. Finally, the bran is treated with alpha or beta-amylase and amyloglucosidase. The recoverable material is protein-free, fat-free and carbohydrate-free insoluble dietary fiber The insoluble dietary fiber content of a variety of dietary fiber sources are also disclosed in publications, including for example "Plant Fiber in Foods" by James W. Anderson, M. D. (published by the HCF Diabetes Research Foundation, Inc., Lexington, Ky.; 1986), incorporated by reference herein in its entirety.

The baked cookie compositions of the present invention comprise from about 0% to about 17%, preferably from about 3% to about 17% of an insoluble dietary fiber, more preferably from about 5% to about 10% insoluble dietary fiber, and most preferably from about 6% to about 8% insoluble dietary fiber, by weight of the baked compositions.

(c) Shortening Component

The present cookie compositions further comprise a shortening component. Fats which can be used as the shortening component can be any of the usual fat stocks employed in preparing liquid, fluid, plastic, or solid shortenings, preferably having a solid content of less than about 25 at room temperature, more preferably having a solid content of less than about 10 at room temperature, and most preferably having a solid content of about 0 at room temperature. Various fats such as cottonseed oil, soybean oil, lard, and other vegetable, animal and marine fats, or mixtures thereof, either unhydrogenated or in various stages of hydrogenation, can be used. Suitable shortening components can also be formulated with non-absorbable, non-digestible fatty acid esters of polyols, in particular sucrose polyesters (disclosed in U.S. Pat. No. 4,005,196 to Jandacek et al., issued Jan. 25, 1977, which is incorporated by reference herein in its entirety), and/or other non-nutritive or reduced calorie fat substitute materials suitable for use in the present compositions.

The baked cookie compositions of the present invention essentially comprise from about 10% to about 20% of the shortening component, preferably from about 13% to about 19% shortening component, and more preferably from about 15% to about 18% shortening component, by weight of the baked cookie composition.

(d) Flour Component

The present cookie compositions also comprise a flour component. Any type of flour which is suitable in cookie doughs can be used in the present invention. For example, suitable flours include wheat flour, rye flour, corn flour, cottonseed meal, and sorghum flour. Preferably, wheat flour is used in preparing the cookie compositions for the present invention. This flour can be bleached or unbleached. Furthermore, starches may constitute a portion of the flour component of the present compositions (preferably less than about 5% of the baked composition).

Most preferred are cookie compositions comprising pregelatinized food starch (e.g., pregelatinized wheat starch; pregelatinized corn starch). Examples of such starches include: Sta-Mist 7415 starch, Sta-Mist 463 starch, and Sta-Mist 454 starch (all sold by A. E. Staley Manufacturing Company; Decatur, Ill.). The baked cookie compositions preferably comprise from about 1% to about 4%, and more preferably from about 1.5% to about 3%, of pregelatinized food starch by weight of the baked cookie composition.

The baked cookie compositions of the present invention comprise from about 10% to about 40% flour component, preferably from about 15% to about 35% flour component, and more preferably from about 17% to about 30% flour component, by weight of the baked cookie compositions.

(e) Sugar Component

The present compositions also comprise a sugar component. Suitable sugar components include sucrose, invert sugar syrups, brown sugar, corn syrup solids, fructose, dextrose (glucose), honey, molasses, maple syrup and the like. Particularly preferred sugar components are sucrose, fructose and corn syrup solids.

The baked cookie compositions of the present invention comprise from about 5% to about 40% of a sugar component, preferably from about 20% to about 40% of a sugar component, preferably from about 25% to about 35% of a sugar component, by weight of the baked compositions.

(f) Water

The cookie compositions of the present invention also comprise water in the range of from about 1.5% to about 3.5%, preferably from about 2% to about 3%, and more preferably about 2.0% to about 2.5%, by weight of the baked composition. Thus, while the dough prior to baking contains substantially more water than this, the dough is baked for a time and at a temperature sufficient to reduce the water content in the present cookie compositions to this level.

The water content of the cookie dough prior to baking is typically in the range of from about 5% to about 15% by weight of the dough. It is to be noted that the weight percentages of the essential components hereinbefore stated are by weight of the cookie composition following baking. The weight percentages of these essential components in the dough are therefore proportionally reduced by an amount which depends on the level of water present in the dough. Finally, it is preferred that the cookie dough be baked soon after preparation since storage of the dough could adversely effect the efficacy and/or aesthetics of the cookie.

(g) Optional Components

The cookie compositions of the present invention may further optionally comprise other components compatible with the psyllium and other essential cookie components, and which are suitable for ingestion. In particular, such components must not significantly reduce the efficacy of the psyllium for the therapeutic uses described herein (especially laxation and/or cholesterol reduction).

One such preferred optional component is one or more emulsifiers, frequently referred to as "dough conditioners" because they are used to control the consistency of the dough. Suitable optional emulsifiers include mono- and diglycerides and fatty acids, sucrose partial fatty acid esters, sorbitan esters of fatty acids, polyoxyethylene sorbitan esters of fatty acids, propylene glycol esters, polyethylene glycol esters, ethoxylated mono- and diglycerides, fumarated esters of monoglycerides or their alkali metal salts, alkanoyl lactylates or their metal salts, lecithins, and the like. Specific dough conditioners include sorbitan monostearate (Span 60), polyoxyethylene sorbitan monostearate (Tween 60), propylene glycol monostearate, glycerol lactopalmitate, sodium stearoyl fumarate, calcium stearoyl-2-lactylate, ethoxylated monoglycerides and lecithin. The amount of emulsifier can be varied to obtain the dough properties desired.

Another preferred optional component is one or more leavening agents. Non-yeast leavening agents include a source of carbon dioxide such as sodium bicarbonate or potassium bicarbonate, alone or in combination with a leavening acid such as monocalcium phosphate, dicalcium phosphate, sodium acid pyrophosphate, sodium aluminum sulfate, sodium aluminum phosphate, potassium acid tartrate and the like. The amount of leavening agent used depends on the particular agent employed and the leavening characteristics desired.

Other optional components which may be included in the dough are milk products such as whole milk, skim milk, buttermilk, whey, concentrated milk product (condensed or evaporated milk), dried milk products, nonfat milk powder, dry whole milk, modified whole milk and the like, egg products, including egg whites and egg yolks, protein sources (e.g., soy protein), non-nutritive artificial sweeteners (e.g., aspartame, acesulfame, saccharin, cyclamate), spices, cocoa powder, flavors such as vanilla, salt, color additives, preservatives, antioxidants and the like. Furthermore, other pharmaceutical active agents may be included as desired into the composition. Such actives include, for example, sennosides (which are laxatives; preferably from about 0.04% to about 0.25% by weight of the baked cookie composition), analgesics, cholesterol reduction agents, etc.

Method for Coating the Psyllium Fibers

Prior to preparing the cookie composition of the present invention, the psyllium fibers must be coated with calcium lactate to form the calcium lactate coated psyllium compositions as described hereinbefore. This coating aids in improving the aesthetics and mouthfeel of the present cookie compositions.

The first step in coating the psyllium fibers is preferably to prepare a calcium lactate solution comprising from about 1% to about 30% by weight of calcium lactate per weight of aqueous solution, and preferably from about 10% to about 20% by weight of calcium lactate per weight of aqueous solution. The temperature of said solution preferably is adjusted to from about 20° C. to about 80° C., and more preferably from about 40° C. to about 55° C.

Once the solution is prepared, the next step typically is to apply the calcium lactate solution onto the psyllium fibers. The application of calcium lactate solution is best achieved by spraying the calcium lactate solution onto the psyllium fibers with appropriate coating equipment known in the art. One example of such equipment is a GPCG 60-18 inch Wurster coater. A detailed description of this type of equipment can be found in U.S. Pat. No. 3,196,827, which is incorporated herein by reference in its entirety.

The psyllium fibers become coated by the calcium lactate in solution. This coating is accomplished by passing the psyllium fiber particles through a zone of finely atomized droplets of calcium lactate coating solution. As the coated psyllium fiber particles move up and away from the coating nozzle, the coating begins to solidify as the particles dry and the coated psyllium fiber is formed. Spraying is preferably continued until the coating of calcium lactate comprises from about 0.5% to about 10% by weight of the psyllium fiber, and more preferably from about 3% to about 7% by weight of the psyllium fiber. The calcium lactate coated psyllium fiber is then preferably dried to a moisture level of from about 5% to about 10%, and most preferred is a moisture level from about 7% to about 8%.

If desired, the optional Type A gelatin coating may be applied to the calcium lactate coated psyllium fibers. This may be achieved by first dissolving Type A gelatin in an aqueous solution comprising from about 2% to about 20%, and preferably from about 8% to about 15% of a Type A gelatin per weight of aqueous solution. The Type A gelatin solution is then adjusted to a temperature of from about 38° C. to about 70° C., and preferably from about 40° C. to about 55° C., so that the temperature is not too low to cause the Type A gelatin to reach a viscosity greater than 500–1000 cps, nor too high to cause extensive hydrolysis of the Type A gelatin. This Type A gelatin solution may then be applied in the same manner as the calcium lactate coating, described hereinabove, until the coating of Type A gelatin comprises from about 1% to about 5% by weight of the psyllium fiber, and more preferably from about 1.5% to about 2.5% of a Type A gelatin by weight of the psyllium fiber. Preferably, the Type A gelatin is sprayed onto core material consisting of the calcium lactate coated psyllium fibers.

Method for Making the Present Cookie Compositions

While the dough to be baked to form the present cookie compositions may be prepared in any manner which does not substantially reduce the efficacy of the psyllium for the therapeutic uses described herein (especially laxation and/or cholesterol reduction), the present invention further relates to a method for preparing the present cookie compositions. This method comprises the steps of: (a) coating the psyllium fibers with calcium lactate and, optionally, Type A gelatin; (b) mixing to a uniform mass either sequentially or all at once the calcium lactate coated psyllium fiber (and preferably the insoluble dietary fiber) with the remaining components of the cookie dough; and (c) baking the dough to reduce the water content of the cookie composition to within from about 1.5% to about 3.5% by weight of the baked cookie composition.

More preferred is the method comprising the steps of: (a) coating the psyllium fibers with calcium lactate and Type A gelatin; (b) mixing to a uniform mass the calcium lactate coated psyllium fiber and insoluble dietary fiber with a saturated aqueous solution of sugar components (wherein said saturated sugar solution comprises from about 12% to about 28% of water by weight of the saturated sugar solution) and a shortening component; (c) mixing the flour component with the mass following step (b); and (d) baking the dough to reduce the water content to within from about 1.5% to about 3.5% by weight of the baked cookie composition.

Temperature and time conditions generally suitable for baking cookie compositions can be used in preparing the baked cookie compositions of the present invention. Typically, the cookie dough is baked at a temperature of from about 325° to about 420° F. (from about 162° to about 216° C.), for from about 9 to about 5 minutes (depending on the baking temperature). Preferably, the cookie dough is baked at a temperature of from about 335° to about 410° F. (from about 168° to about 210° C.), for from about 8 to about 7 minutes. The particular baking conditions employed depend upon the size of the cookie dough being baked, the particular level of water desired in the final product, the particular oven used, and like factors. The term "baking", as used herein, means radiant, conductive, or convective exposure to energy of a type which imparts thermal energy to the cookie dough being baked. It thus includes conventional, convection, dielectric and microwave oven baking.

Methods of Treatment

The present invention also relates to a method for providing laxation and regulating bowel function for a human in need of such treatment. This method comprises administering to a human in need of such treatment a safe and effective amount of a psyllium-containing cookie composition of the present invention. Ingestion of from about 2.5 grams to about 30 grams per day of the psyllium fiber in a cookie composition according to the present invention is appropriate in most circumstances to produce laxation. However, this can vary with the size and condition of the patient, and such matters will, of course, be apparent to the attending physician. However, since the psyllium material is nontoxic, even higher ingestion levels can be used without undue side effects. A typical dose for laxation purposes involves administering from about 3 to about 15 grams of psyllium fiber in one dose.

The present invention further relates to methods for reducing serum cholesterol levels in humans. These methods comprise orally administering to a human in need of having a lowered blood cholesterol level a safe and effective amount of a psyllium-containing cookie composition of the present invention. Ingestion of compositions of the present invention comprising amounts sufficient to administer from about 2.5 grams to about 30 grams per day of psyllium fiber, preferably from about 5 grams to about 15 grams, is appropriate in most circumstances. However, this can vary with the size and condition of the patient, and the patient's blood cholesterol level. Such matters will, of course, be apparent to the attending physician. However, since the psyllium material is nontoxic, even higher ingestion levels can be used without undue side effects, keeping in mind the materials herein have the hereinbefore noted laxative effect.

Treatment of the patient to reduce serum cholesterol levels comprises chronic ingestion in order to lower and maintain the lowered cholesterol levels. Daily ingestion is preferred, and a daily ingestion of from about 5 grams to about 15 grams of the psyllium fiber is most commonly used, with said ingestion preferably being at 2 or 3 regularly spaced intervals throughout the day. Again, depending on the patient's size and cholesterol level in the patient's blood, this can be varied.

The following examples further describe and demonstrate embodiments within the scope of the present invention. The examples are given solely for the purpose of illustration and are not to be construed as limitations of the present invention as many variations thereof are possible without departing from the spirit and scope.

EXAMPLE I

Cinnamon Spice Cookies

A psyllium-containing cookie composition according to the present invention is prepared having the following components:

a) RO water = reverse osmosis purified water
b) Steam sanitized, sized psyllium mucilloid coated with calcium lactate (5%) and Type A gelatin (1.8%) as described hereinafter
c) 80% microfine oat hull fiber sold by Canadian Harvest, St. Thomas, Ontario, Canada; approximately 80% insoluble fiber
d) Distributed by Gateway Food Products, Dupo, Ill.
e) Unbleached, undried cookie flour sold by H. Nagel & Co., Cincinnati, Ohio
f) About 6.2% insoluble dietary fiber
g) Sta-Mist 741S Starch supplied by A. E. Staley Manufacturing Company, Decatur, Ill.

The manufacturing procedure is as follows:

A. Procedure to coat the psyllium fiber:

1. Prepare a 10% solid aqueous calcium lactate solution (using calcium lactate pentahydrate sold by Gallard-Schlesinger Industries, Inc., Carle Place, N.Y.), and adjust the solution temperature to approximately 50° C.;
2. Adjust the GPCG 60-18 Wurster coater to the following parameters:
   (a) fluidizing air volume 350-400 cubic feet/minute
   (b) atomizing air pressure 4.0 bar
   (c) inlet air temperature 72°-77° C.
   (d) outlet air temperature 34°-40° C.
   (e) nozzle size 1.2mm
   (f) pump Rate 300 grams/min.
   (g) partition height 22.5 in.
   (h) partition gap 0.75 in.
   (i) run time 70 min.
3. Spray the psyllium fibers using the Wurster coater, described hereinabove, until the psyllium fibers are encapsulated with 5% calcium lactate by weight of the psyllium fiber.
4. Dry the calcium lactate-encapsulated psyllium fibers to a moisture level of 7.7%.
5. Prepare a 10% solids aqueous gelatin solution by dissolving pigskin gelatin Type A, 275 bloom (sold by Knox gelatin, Inc., Saddle Brook, N.J.) and adjust the solution temperature to 50° C.
6. Adjust the GPCG 60-18 Wurster coater to the following parameters:
   (a) fluidizing air volume 600 cubic feet/minute
   (b) atomizing air pressure 4.0 bar
   (c) inlet air temperature 64°-76° C.
   (d) outlet air temperature 37°-42° C.
   (e) nozzle size 1.2 mm
   (f) pump rate 265 grams/min.
   (g) partition height 22.5 in.
   (h) partition gap 0.75 in.
   (i) run time 38 min.
7. Spray the calcium lactate-encapsulated psyllium fibers, using the Wurster coater, described hereinabove, until the calcium lactate coated psyllium fibers are coated with 1.8% Type A gelatin by weight of the calcium lactate coated psyllium fiber.

A suitable alternate coating may be prepared for the psyllium fiber by deleting steps (5) through (7) and coating the psyllium fiber with only calcium lactate, using the procedure described in steps (1) through (4) hereinabove.

B. Procedure for manufacturing psyllium-containing cookie composition:

1. Add fructose, 12.33% sucrose by weight of dough, molasses and RO water to the mixer and mix 2 minutes (Sweet Dough Mixer sold by Peerless Machinery Corporation, Sidney, Ohio; at 22 rpm);
2. Add calcium lactate coated psyllium, oat fiber, corn oil and lecithin to the mixer and mix 2 minutes;
3. Add starch, RO water, cinnamon, nutmeg, ascorbic acid, vanilla and butter flavor to the mixer and mix for 1 minute;
4. Add flour and soda to the mixer and mix 2 minutes;
5. Add remaining portion of the sucrose, 5.29% by weight of dough, and mix for 2 minutes;
6. Add oats and mix for 1 minute, scrape down and mix another minute and 45 seconds;
7. Empty finished dough batch into trough;
8. Empty trough into rotary dough hopper and rotary mold rectangles having correct dimensions (approx. 6.35cm length × 4.1 cm width × 0.76cm height);
9. Bake in a 3 zone oven (Wernaire Automatic Recirculating Oven; Werner Lahara, Grand Rapids, Mich.) for 7-8 minutes [(approximate zone temperature between 325°-360° F. (162° to 182° C.); dictated by quality];
10. Allow to cool on a wire mesh belt for approx. 10 minutes. These baked cookies contain the following amounts of essential ingredients: 13.05% psyllium fiber; 0.76% calcium lactate; 0.31% Type A gelatin; 7.08% insoluble dietary fiber; 16.74% shortening component; 18.22% flour component; 27.32% sugar component; and 2.2% water.

Consumption of 2 of these cookies daily by a person in need of laxation provides effective laxative benefits and regulates bowel function. These cookies are convenient to use and provide psyllium in a very palatable form.

Substitution of about one-third of the corn oil component in this cookie composition with a non-absorbable, non-digestible sucrose polyester (a mixture of sucrose hexa-, hepta-, and octa-esters of soybean oil fatty acids) provides a reduced calorie cookie composition according to the present invention. These cookies are also particularly well suited for use in reducing serum cholesterol levels in humans in need of such benefit. Ingestion of 6 of these cookies, taken in portions of 2 cookies at three regularly spaced intervals throughout the day, is desirable for this purpose.

What is claimed is:

1. Calcium lactate coated psyllium fiber composition comprising:
   (a) from about 85% to about 99.5% psyllium fiber;
   (b) from about 0.5% to about 10% of calcium lactate coating on the psyllium fiber; and
   (c) from about 0% to about 5% of Type A gelatin coating on the psyllium fiber.

2. Calcium lactate coated psyllium fiber composition according to claim 1 wherein the psyllium fibers are coated with from about 3% to about 7% of calcium lactate and from about 1.5% to about 2.5% of Type A gelatin.

3. Calcium lactate coated psyllium fiber composition according to claim 2 wherein said composition is manufactured by a process wherein the psyllium fibers are first coated with calcium lactate followed by coating with Type A gelatin.

4. Psyllium-containing baked cookie composition comprising:
   (a) from about 10% to about 20% calcium lactate coated psyllium fiber;
   (b) from about 0% to about 17% of an insoluble dietary fiber;
   (c) from about 13% to about 20% of a shortening component;
   (d) from about 10% to about 40% of a flour component;
   (e) from about 5% to about 40% of a sugar component; and
   (f) from about 1.5% to about 3.5% water.

5. Psyllium-containing baked cookie composition according to claim 4 wherein the calcium lactate coated psyllium fiber comprises from about 0.5% to about 10% calcium lactate by weight of the coated psyllium fiber.

6. Psyllium-containing baked cookie composition according to claim 5 wherein the calcium lactate coated psyllium fiber comprises from about 3% to about 7% calcium lactate by weight of the coated psyllium fiber.

7. Psyllium-containing baked cookie composition according to claim 4 wherein the calcium lactate coated psyllium fiber comprises, by weight of the coated psyllium fiber:
   (a) from about 85% to about 99.5% psyllium fiber;
   (b) from about 0.5% to about 10% of calcium lactate coating on the psyllium fiber; and
   (c) from about 0% to about 5% of a Type A gelatin coating on the psyllium fiber.

8. Psyllium-containing baked cookie compositions according to claim 7 wherein the calcium lactate coated psyllium fiber comprises, by weight of the coated psyllium fiber:
   (a) from about 3% to about 7% of calcium lactate coating on the psyllium fiber; and
   (b) from about 1.5% to about 2.5% of a Type A gelatin coating on the calcium lactate coated psyllium fiber; and wherein the psyllium fibers are first coated with calcium lactate followed by coating with Type A gelatin.

9. Psyllium-containing baked cookie composition according to claim 4 wherein the insoluble dietary fiber comprises from about 3% to about 17% of one or more cereal brans.

10. Psyllium-containing baked cookie composition according to claim 9 wherein the insoluble dietary fiber comprises cereal bran selected from the group consisting of wheat, corn, barley, rye, oats and mixtures thereof.

11. Psyllium-containing baked cookie composition according to claim 4 wherein the shortening component comprises a non-absorbable, non-digestible fatty acid ester of polyols.

12. Psyllium-containing baked cookie composition according to claim 4 further comprising sennoside.

13. A method for making a psyllium-containing baked cookie composition according to claim 4, said method comprising the steps of:
   (a) coating the psyllium fibers with calcium lactate and, optionally, Type A gelatin;
   (b) mixing to a uniform mass, either sequentially or all at once, the calcium lactate coated psyllium fiber with the remaining components of the cookie dough; and
   (c) baking the dough to reduce the water content of the cookie composition.

14. A method for making a psyllium-containing baked cookie composition according to claim 13 wherein insoluble dietary fiber is mixed into the mass during step (b).

15. A method for making a psyllium-containing baked cookie composition according to claim 4, said method comprising the steps of:
   (a) mixing to a uniform mass a calcium lactate coated psyllium fiber composition comprising from about 85% to about 99.5% psyllium fiber and from about 0.5% to about 10% of calcium lactate coating on the psyllium fiber and from about 0% to about 5% of Type A gelatin coating on the psyllium fiber either sequentially or all at once, with the remaining components of the cookie dough; and
   (b) baking the dough to reduce the water content of the cookie composition.

16. A method for making a psyllium-containing baked cookie composition according to claim 15 wherein said calcium lactate coated composition comprises psyllium fibers first coated with from about 3% to about 7% of calcium lactate followed by coating with from about 1.5% to about 2.5% of Type A gelatin.

17. A method for providing laxation and regulating bowel function in a human, said method comprising administering to a human in need of such treatment a safe and effective amount of a psyllium-containing baked cookie composition according to claim 4.

18. A method for providing laxation and regulating bowel function in a human, said method comprising administering to a human in need of such treatment a safe and effective amount of a psyllium-containing baked cookie composition comprising sennosides according to claim 9.

19. A method for reducing serum cholesterol levels in humans, said method comprising administering to a human in need of such treatment a safe and effective amount of a psyllium-containing baked cookie composition according to claim 4.

20. A method for reducing serum cholesterol levels in humans, said method comprising administering to a human in need of such treatment a safe and effective amount of a psyllium-containing baked cookie composition comprising a non-absorbable, non-digestible fatty acid ester of polyols according to claim 11.

* * * * *

UNITED STATES PATENT OFFICE
CERTIFICATE OF CORRECTION

PATENT NO. : 5,126,150

DATED : June 30, 1992

INVENTOR(S) : David M. Piatt, Julia M. Courts, Mary M. Fox

It is certified that error appears in the above-identified patent and that said Letters Patent is hereby corrected as shown below:

Column 11, line 7 should be

| --Component | Wet Weight % (by weight of dough) |
|---|---|
| Fructose | 6.91 |
| Sucrose | 17.62 |
| Molasses$^{a)}$ | 0.50 |
| RO Water | 3.51 |
| Coated Psyllium$^{b)}$ | 13.70 |
| Oat Fiber$^{c)}$ | 6.51 |
| Corn Oil$^{d)}$ | 15.03 |
| Soy Lecithin | 1.00 |
| RO Water | 3.50 |
| Sodium Bicarbonate | 0.20 |
| Flour$^{e)}$ | 18.80 |
| Rolled Oats$^{f)}$ | 9.02 |
| Vanilla Flavor | 0.20 |
| Butter Flavor | 0.20 |
| Cinnamon | 0.90 |
| Nutmeg | 0.25 |
| Starch | 2.00 |
| Ascorbic Acid | 0.15 |
| | 100.00-- |

UNITED STATES PATENT AND TRADEMARK OFFICE
CERTIFICATE OF CORRECTION

PATENT NO. : 5,126,150

DATED : June 30, 1992

INVENTOR(S) : David M. Piatt, Julia M. Courts, Mary M. Fox

It is certified that error appears in the above-indentified patent and that said Letters Patent is hereby corrected as shown below:

Column 5, line 1 "B" should be --8--.

Signed and Sealed this

Twenty-eighth Day of September, 1993

Attest:

BRUCE LEHMAN

Attesting Officer     Commissioner of Patents and Trademarks